US010324913B2

(12) United States Patent
Lavalaye et al.

(10) Patent No.: US 10,324,913 B2
(45) Date of Patent: Jun. 18, 2019

(54) CREATING AND USING ACCESS ZONES FOR DELIVERING CONTENT

(71) Applicant: Nextgeofence B.V., Amsterdam (NL)

(72) Inventors: Jesse Lavalaye, Amsterdam (NL); Carl William Kerchmar, Amsterdam (NL)

(73) Assignee: NEXTGEOFENCE B.V. (NL)

( * ) Notice: Subject to any disclaimer, the term of this patent is extended or adjusted under 35 U.S.C. 154(b) by 532 days.

(21) Appl. No.: 14/427,577

(22) PCT Filed: Sep. 12, 2013

(86) PCT No.: PCT/EP2013/068946
§ 371 (c)(1),
(2) Date: Mar. 11, 2015

(87) PCT Pub. No.: WO2014/041092
PCT Pub. Date: Mar. 20, 2014

(65) Prior Publication Data
US 2015/0234868 A1    Aug. 20, 2015

Related U.S. Application Data

(60) Provisional application No. 61/700,566, filed on Sep. 13, 2012, provisional application No. 61/700,035, filed on Sep. 12, 2012.

(51) Int. Cl.
*G06F 17/30* (2006.01)
*G06F 16/22* (2019.01)
(Continued)

(52) U.S. Cl.
CPC ............. *G06F 16/22* (2019.01); *G06F 16/29* (2019.01); *G06F 16/86* (2019.01); *G06F 16/951* (2019.01);
(Continued)

(58) Field of Classification Search
None
See application file for complete search history.

(56) References Cited

U.S. PATENT DOCUMENTS

2007/0049296 A1*  3/2007  Gupta .................. H04W 4/023
                                                455/456.5
2007/0070978 A1*  3/2007  Bell ...................... G06F 17/30
                                                370/352
(Continued)

FOREIGN PATENT DOCUMENTS

EP          1530342 A2      5/2005
EP          2416288 A1      2/2012
WO       WO2014041092 A1   3/2014

OTHER PUBLICATIONS

International Preliminary Report on Patentability; dated Mar. 17, 2015 for the corresponding PCT Application No. PCT/EP2013/068946.

*Primary Examiner* — Thu N Nguyen
(74) *Attorney, Agent, or Firm* — Mendelsohn Dunleavy, P.C.

(57) ABSTRACT

The invention enables providing content to an access zone or geographical sector within the access zone. The access zone comprises a first communication node or one or more further communication nodes forming together with a first communication node a mesh network within the access zone. Content is received in a distribution node from a content provider, which content is associated with a geographical location. The geographical location is mapped with location coordinates stored in a first storage device associated with the distribution node, wherein the location coordinates falls within the access zone or geographical sector, and the first communication node of the access zone is thus determined. The content is transmitted from the distribution node to the
(Continued)

first communication node, where it is stored for use by a user device in the access zone or geographical sector.

26 Claims, 7 Drawing Sheets

(51) Int. Cl.
| | | |
|---|---|---|
| *G06F 16/29* | (2019.01) | |
| *G06F 16/84* | (2019.01) | |
| *G06F 16/951* | (2019.01) | |
| *H04W 4/021* | (2018.01) | |
| *H04L 29/08* | (2006.01) | |
| *H04L 29/12* | (2006.01) | |
| *H04W 84/18* | (2009.01) | |

(52) U.S. Cl.
CPC ............ *H04L 61/609* (2013.01); *H04L 67/18* (2013.01); *H04W 4/021* (2013.01); *H04W 84/18* (2013.01)

(56) References Cited

U.S. PATENT DOCUMENTS

| | | | |
|---|---|---|---|
| 2011/0122798 A1* | 5/2011 | Hughes | G01D 4/004 370/254 |
| 2012/0224672 A1 | 9/2012 | Tholkes et al. | |
| 2012/0225672 A1* | 9/2012 | Tholkes | H04W 4/021 455/456.3 |

* cited by examiner

CREATING AND USING ACCESS ZONES FOR DELIVERING CONTENT

FIELD OF THE INVENTION

The invention relates to a method for creating an access zone for providing content from a content provider to a user device located in the access zone, a method for providing content to an access zone or geographical sector within the access zone, a method for providing the content to the user device in the access zone or the geographical sector within the access zone, a communication node in a mesh network of communication nodes for providing content to a user device, a distributing node for enabling the delivery of content from a content provider to a communication node of a mesh network of communication nodes, and a content delivery system for delivering content associated with a predefined access zone or geographical sector to a user device.

BACKGROUND

The Internet has become an incredible source for providing of information and content. User devices transmit requests to a global network of web servers, and these servers return information through the global network to the user devices. Although the Internet makes a large volume of information available, finding information relevant to the user and providing that relevant information to the user are not easy tasks.

Conventional methods for obtaining relevant content from the Internet typically involves typing in search terms in a search engine provided on a website, optionally providing the location of the user via the user's IP address or GPS location, and retrieving a list of search results matching the search terms and optionally matching the location of the user. Hereto, the search engine on a web server executes a search algorithm to determine the search results. The search results, which are typically provided as hyperlinks, are then provided to the user on the user device, where the user can click/select the hyperlinks to obtain information hosted on other web servers. Although search engines are used ubiquitously, such method suffers from several deficiencies.

First, the search results may not always be relevant to the user. For instance, the search results may include spam links to web servers hosting websites having the search terms and/or keywords but no actual relevant information. In another instance, the search results may not always show the most relevant information at the top of the search results because the ranking of search results and the search algorithm itself is not precise and accurate. The search results are at best guesses as to what is relevant to the user. Based on concurrent search algorithms that favor listing web pages with more links can hinder information that is timely and local relative to the searcher therefore search on Internet information can be out of date and/or not real time.

Second, the Internet and the search results are potentially insecure. The links, especially in case of spam links, may lead to websites aiming to spread viruses to various devices, or to web servers whose identity or content cannot be trusted. Because anyone can host a web server on the Internet, the ease of entry enables anyone to provide content on the Internet and measures cannot always keep up with spammers to ensure that the search results and the content retrieved are secure.

Third, the Internet provides relatively little privacy protection for users. Information that flows on the Internet to various web servers may be easily obtainable by malicious parties, and little limits in the Internet are placed on where sensitive information can travel. The need for protecting privacy is particularly high when users are sharing location information of the user or the user device.

Moreover, the Internet-based architecture is particularly not useful when a user device is not conveniently communicably connected to the Internet or is technically not capable or suitable to connect to the Internet. For instance, a user device in the form of a mobile Internet device (e.g. a smartphone, tablet or any other mobile device capable of accessing the Internet) may be roaming on a foreign network different from its home network and may not want to incur charges for using the foreign network. In another instance, a mobile Internet device may not be configured with the technical means to access a foreign network, e.g. due to different use of frequency bands or wireless access technologies, or the mobile network may be (possibly temporarily) unavailable for connecting the mobile Internet device to the mobile network.

Mobile Internet devices typically use a common fixed (i.e. cable) infrastructure by linking to a telecoms' network of cellular and/or Wi-Fi antennas. Developing and advanced economic regions alike are experiencing a dramatic increase in the use of mobile Wi-Fi devices being used to access the Internet and therefore further accentuating the architectural issues, security weaknesses and overflow of irrelevant content. Mobile communication has developed along the proliferation of base stations emitting cellular and/or Wi-Fi networks that create access zones and roaming possibilities between zones. Herein, the base stations are communications nodes that may process user location information based on e.g. predetermined geographical information and unique user Identification Numbers assigned to e.g. a subscribers SIM card located in the mobile device. The infrastructure used by mobile Internet devices is typically designed to extend a subscription based regional, national or global coverage of service zones for access to the Internet and World Wide Web.

Besides the above mentioned drawbacks, another drawback of conventional Internet-based network architectures is the amount of data traffic already present and the (increasing) demand for content/services from users all over the world. When for example a website becomes suddenly popular or the demand for content/services on the website is relatively high, without an expensive and complex distributed server infrastructure the website could be unable to serve the global demand or even worse, crash. For example in situations where large crowds are gathered and the amount of concurrent Internet users increases, data flows to and from user devices may experience a bottleneck. As a result that users—especially users to which the content/service is most relevant—may not be able to access the content and/or services.

Furthermore, access to the Internet and the infrastructure to access the Internet is not always optimal, especially in developing countries or rural areas. Because of this, users could lack access to content and services that are relevant to them at a particular time and place.

For both poor and wealthy regions alike, the technical needs for connecting to the Internet and the World Wide Web ultimately comes down to cables connecting local routers to Internet exchange hubs directing data via transoceanic and/or underground cable networks. As this infrastructure grows, it increases in traffic and therefore so does the energy cost to support and sort its burgeoning data.

US 2009/0257376 discloses a method for delivering location based information in wireless zone. Herein the location based information is stored in the access point itself eliminating the need for a backend server. The access point has intelligence to deliver information customized to each requesting device's display capability. To provide seamless access to local information the user gets a default web page once the device connects to the access point and tries to access internet. This web page acts as a gateway to all the location based information available in the access point. A disadvantage of the method disclosed in US 2009/0257376 is that the information is tied to the (Wi-Fi) access point only. Furthermore, the geographical area (coverage) where the information is available cannot be modified.

While the Internet infrastructure is a global network infrastructure, Internet's data flows may actually be related to a specific (e.g. geographical) area and the users within this areas. The Internet infrastructure does not take this localized use of data into account, while there is a need to limit the amount of data on the Internet and the supporting costs of data transfer and storage to devices in such areas.

Thus, there is a need for a solution that enables content, such as can be found on the Internet, to be distributed to user devices in a way that aspects of relevancy of the content, security, privacy protection, connectivity convenience, optimal use of network resources and localized use of the content can be taken into account.

SUMMARY OF THE INVENTION

According to an aspect of the invention a method for providing content to an access zone or geographical sector within the access zone is proposed. The access zone comprises a first communication node or one or more further communication nodes forming together with a first communication node a mesh network within the access zone. The method comprises receiving the content in a distribution node from a content provider, said content being associated with a geographical location. The method further comprises mapping the geographical location with location coordinates stored in a first storage device associated with the distribution node, the location coordinates falling within the access zone or geographical sector. The method further comprises retrieving from the first storage device an indication of a first communication node of the access zone. The method further comprises transmitting the content from the distribution node to the first communication node. The method further comprises storing the content in a second storage device associated with the first communication node from where the content is providable to a user device in the access zone or geographical sector.

According to another aspect of the invention a communication node in a mesh network of communication nodes is proposed for providing content to a user device. Said user device can be in wireless communication with at least one of the communication nodes of the mesh network. The communication nodes of the mesh network are located within a predefined access zone. The communication node is configured to receive content from a content provider, said content being associated with a location in the predefined access zone. The communication node is further configured to store the content in a storage device associated with the communication node. The communication node is further configured to provide the content from the communication node to the user device if the user device is located in the first access zone.

According to another aspect of the invention a distributing node is proposed for enabling the delivery of content from a content provider to a communication node of a mesh network of communication nodes. One of the communication nodes is a first communication node. The communication nodes are located within a predefined access zone and configured to wireless communicate with a user device. Said distributing node is configured to receive the content from the content provider, said content being associated with a geographical location. Said distributing node is further configured to map the geographical location with location coordinates stored in a first storage device associated with the distribution node. The location coordinates fall within the predefined access zone or geographical sector. Said distributing node is further configured to retrieve from the first storage device an indication of a first communication node of the access zone. Said distributing node is further configured to transmit the content from the distribution node to the first communication node.

According to another aspect of the invention a content delivery system is proposed for delivering content associated with a predefined access zone or geographical sector to a user device. Said system comprises at least one communication node as defined in the claims and a distributing node as defined in the claims.

The different aspects of the invention have in common that the content can be made available from the first communication node to user devices in the thus predefined access zone. Access to content that is not stored in the first communication node may be blocked from access or filtered, thereby minimizing the chance of accessing malware or spam from user devices in the access zone. Content access is thus more secure. Similarly, because data traffic can be delimited to the access zone, there is less chance of eavesdropping communications, thus increasing privacy protection. Network resources can be optimally used, as mostly local (i.e. inside the access zone) network resources are used when accessing the content in an access zone. The content is typically relevant to parties in the access zone, thus localized use of the content is taken into account.

Furthermore, use of the access zone by the user device can be bound to a specific predefined location regardless of a user's preferences within said access zone. This is achieved by giving the distribution node and/or network node(s) control over the access to the content. Access zones may receive content from any content provider, e.g. from a web server in the World Wide Web or from a content source within the access zone. Users in the access zone can be restricted to have access to content in the access zone only, but it may be allowed to have access to external content. For example search queries, navigation requests and communication with other devices in said access zone can advantageously be performed without engaging the internet infrastructure. Additional content can advantageously be created, stored and deleted within an access zone.

A storage device is any device or part of a device for storing data. Examples of storage devices are a hard disk, a RAM, a SSD disk, a database on a hardware server, or any other data storage means.

The embodiments of claims 2, 17 and 25 advantageously enable content in the access zone and/or geographical sector to be available for a predefined amount of time or in a predefined time frame.

The embodiment of claim 3 advantageously enables content from outside an access zone, e.g. from a web server on the World Wide Web, to be made available to the access zone.

The embodiment of claim 4 advantageously enables content from within an access zone, e.g. from a server of a merchant in the access zone of from a user device, to be made available to the access zone.

The embodiment of claim 5 advantageously enables a geographical sector to be dynamic. Dynamic geographical sectors e.g. enable the content to stay relevant to the users accessing the content, even if the content may move (e.g., like a parade, or emergency information for routing traffic during events, etc.).

The embodiment of claim 6 advantageously enables content to migrate when a geographical sector changes.

The embodiment of claim 7 advantageously enables access from a user device to the content based on the location of the user device. When it has been determined that the user device is in the access zone, then the content may be provided to the user device.

The embodiment of claim 8 advantageously enables a precise localization of the user device.

The embodiment of claim 9 advantageously enables content to be available to user devices within the access zone only or restricting access to the content if the user device is outside the access zone.

The embodiment of claim 10 advantageously enables a user device to become a content provider. This is particularly useful is the user device enriches the content by e.g. adding information, modifying information or making any other modifications to the content.

The embodiment of claim 11 advantageously enables navigation means to the user for finding a geographical sector for accessing content of that geographical sector.

The embodiment of claim 12 advantageously enables content to be available to user devices within the geographical sector only or restricting access to the content if the user device is outside the geographical sector.

The embodiment of claim 13 advantageously enables search queries to be handles locally, i.e. within the access zone.

The embodiment of claim 14 advantageously enables navigation means to the user for finding an access zone for accessing content of that access zone.

The embodiment of claim 15 advantageously enables the content to be available at the location of the communication node.

The embodiment of claim 16 advantageously enables guidance to points of interest within the access zone or geographical sector.

According to an aspect of the invention a method is provided for creating an access zone for providing content from a content provider to a user device located in the access zone. The method comprises determining one or more location coordinates falling within a predefined geographical area where the access zone is to be created. The method further comprises storing in a storage device one or more location coordinates falling within the access zone. The method further comprises storing in the storage device an indication of a first communication node where the content is to be stored for use within the access zone and from where the content is providable to the user device.

The predefined geographical area may be any area in a two or three dimensional Cartesian space on a map. When drawn on a map the geographical area may e.g. be shaped as a polygon. The location coordinates may be expressed as two-dimensional Cartesian coordinates in the form of (x,y) or as three-dimensional Cartesian coordinates in the form of (x,y,z). It is possible to use any other kind of expression for the coordinates.

The creating of the access zone typically uses an algorithm to translate physical place qualities related but not limited to geographic, political and/or economic information into a database for use by the distribution node and a mapping function available to the distribution node to orchestrate with the first communication node and its surrounding communication nodes in a mesh typology. Hereinafter the thus created access zone is also called a predefined access zone. The content provider is for example a web server or any other server hosting content. The access zone defines a geographical area and/or volume provided by an urban area, a suburban area or a rural area.

Thus, an access zone wherein content can be made available to user devices can be dynamically defined and created.

The embodiment of claim 19 advantageously enables an access zone to include a mesh network of communication nodes.

The embodiments of claims 20 and 26 advantageously enable the definition and creation of more localized areas for offering content within the access zone. The geographical sector associated with the content may be defined as a point having at least two coordinates, a two-dimensional area or a three-dimensional space.

The embodiment of claim 21 advantageously enables each communication node to be informed about the other participating communication nodes in the access zone.

The embodiment of claim 22 advantageously enables the creation of a predefined access zone prior to the use of the access zone.

According to an aspect of the invention a computer program product is proposed. The computer program product is implemented on computer-readable non-transitory storage medium. The computer program product is configured for, when run on a computer, executing one or more of the method steps as defined in the claims.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION

To alleviate at least some of the drawbacks of the prior art, improved methods and systems for providing location-specific content to users are disclosed.

Figure 1:
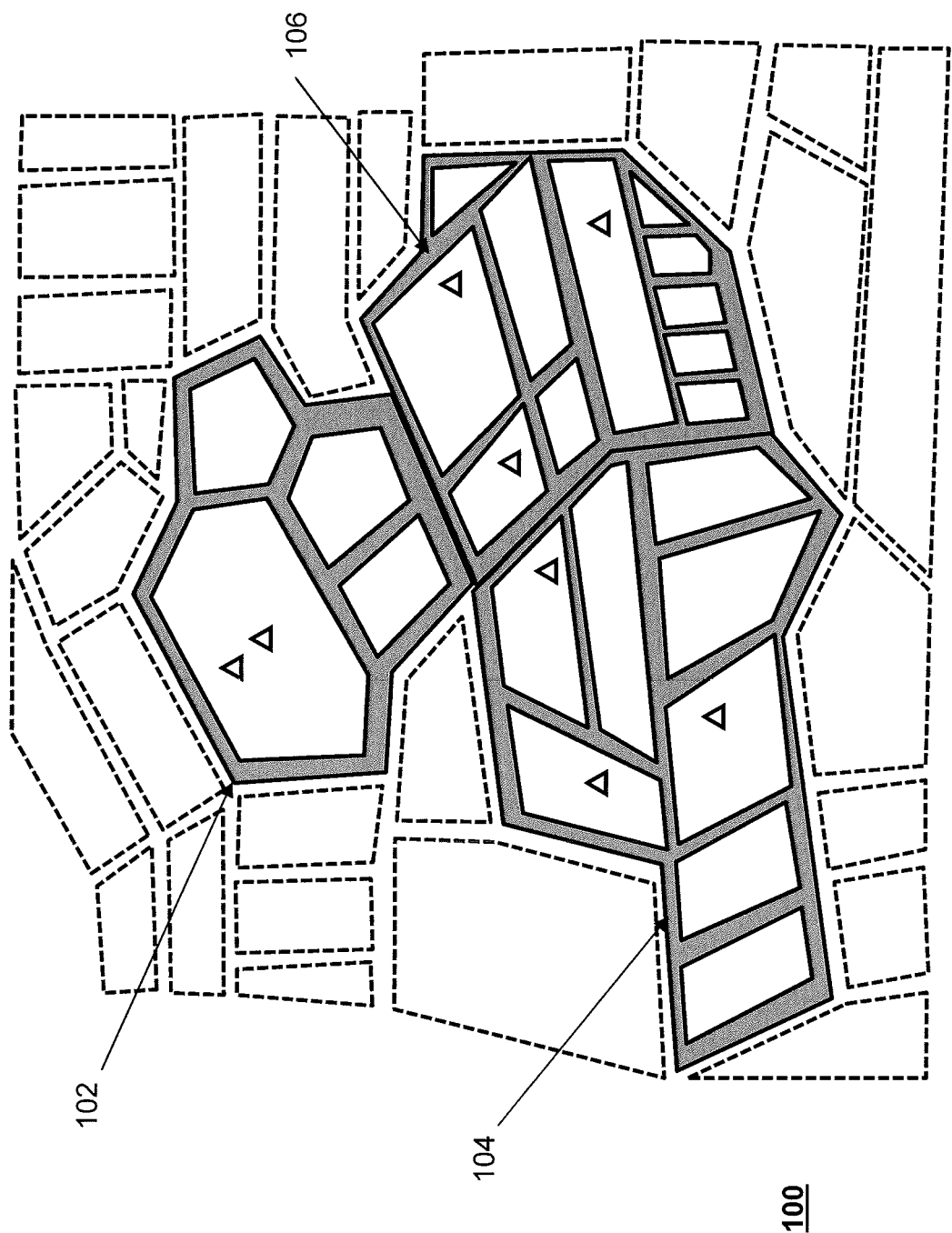
FIG. 1 shows an exemplary map depicting three predefined access zones and a plurality of points of interests.

FIG. 1 shows an exemplary map 100 depicting three predefined access zones 102, 104, 106 and a plurality of points of interests (denoted as triangles). At least one communication node is located within a particular predefined access zone such that users having a user device may wirelessly connect to a communication node to access location-specific content.

The predefined access zones are typically created by an algorithmic method an may be zones defined by physical features of the geography, cultural border, and/or political borders such as: an urban area, a suburban area, a rural area, buildings, streets, rivers, canals, bodies of water, roads, highways, neighborhood borders, national borders, regional borders, city border, district borders, building borders etc. In some embodiments, a predefined access zone may be defined as an area where a person is able to reach from one point in the area to another point in the area within a particular period of time (e.g., approximately 5, 10, or 15 minutes). In the context of the disclosure, the predefined access zone is not a zone that is associated with an area of reception and/or a communication range to an antenna or base station.

Inside a predefined access zone, various points of interests (the depicted triangles) may exist, such as a restaurant, a park, a supermarket, a store, a hospital, a building, an event, etc. Content providers associated with those points of interests, e.g., may wish to distribute and/or make location-specific content associated with specific points of interest accessible or available to users nearby. The location-specific content may include emergency announcements, public service announcements, advertisements, news, traffic information, weather information, construction information, air quality information, environmental conditions, and/or any content specific to a location. In the context of the disclosure, a location may include a point having at least two coordinates, a two-dimensional area, and/or a three-dimensional space.

Consider a situation where a user is using a mobile device in an urban area, and the user would like to use the mobile device to search for and retrieve/receive content (and/or service(s)) that is nearby (e.g., within approximately 10 minute walking distance), with optional search parameters. Conventional methods provide the user with Internet access where the user can perform a search query on the World Wide Web (by providing location information and suitable search parameters) using a search engine. However, not all of the points of interest having location-specific content (i.e., the depicted triangles) would show up in a search query on a search engine. Furthermore, the user would have to have access to a mobile network and/or the Internet to access the search engine and/or the search results. The location information of the user device would have to be shared with the search engine, which affects the privacy of the user.

The systems and methods disclosed provide an architecture in which location-specific content can be efficiently provided to a user device, while alleviating some of the problems mentioned herein. Content, or sometimes referred to as a content item, may be associated with a geographical sector. For instance, the content may be an advertisement associated with a department store, and said department store has a geographical sector, which may include the building and/or a part of the building of the department store and optionally, its surrounding streets or area. The geographical sector associated with content may include a point having at least two coordinates, a two-dimensional area, and/or a three-dimensional space.

Predefined access zones may be provisioned with one or more communication nodes. The communication nodes may store content that is accessible by user devices in wired or wireless communication with the communication nodes. For instance, the user devices may be communicably connected through Wi-Fi, or other types of wireless technologies to the communication node. Only user devices located within a predefined access zone may have access to the content. By providing the content and storing the content at communication nodes located within the predefined zones, and restricting access to the content if the user device is located outside of the predefined access zone, user devices are able to obtain location-specific and relevant information from a local communication node (in a relatively more secure manner) and avoid having to connect to the Internet.

Based on the geographical sector associated with the content, it can be determined whether the geographical sector is in or intersects with a predefined access zone. If the geographical sector is in or intersects with the predefined access zone, the content is provided to at least one of the communication nodes. A communication node in the predefined access zone may then store and enable a user device located within the predefined access zone to access the content.

As one skilled in the art would appreciate, the architecture may accommodate geographical sectors and/or predefined access zones having various sizes and/or geometry. Access to content stored in a storage device of a communication node may be restricted for user devices in different ways, depending on the application.

In some embodiments, the geographical sector may be smaller in size or geographical area than a predefined access zone. In some cases, a user device located within the predefined access zone may access the content associated with that geographical sector. In some cases, if higher restriction (or less geographical reach) is needed, a user device located within the geographical sector may access the content. Even if the user device is located within the predefined access zone, if the user is not within the geographical sector, the user may not access the content.

In some embodiments, the geographical sector may be substantially and/or exactly the same as a predefined access zone. For instance, the content may not be restricted to a particular (smaller) geographical sector. For instance, general information such as weather, traffic, air quality, or public service announcements may not be particularly tied to a location. In these cases, the geographical sector is substantially the same as the predefined access zone, and a user device within the predefined access zone may have access to the content.

In some embodiments, the geographical sector may be larger in size than the predefined access zone. In these cases, the content is accessible by user devices located within the predefined access zone, and/or where the geographical sector may overlap with the predefined access zone. In some embodiments multiple sectors created by one or diverse content providers may coexist in an access zone.

Once an access zone has been defined and created, the process of sending content to an access zone may start.

Figure 2:
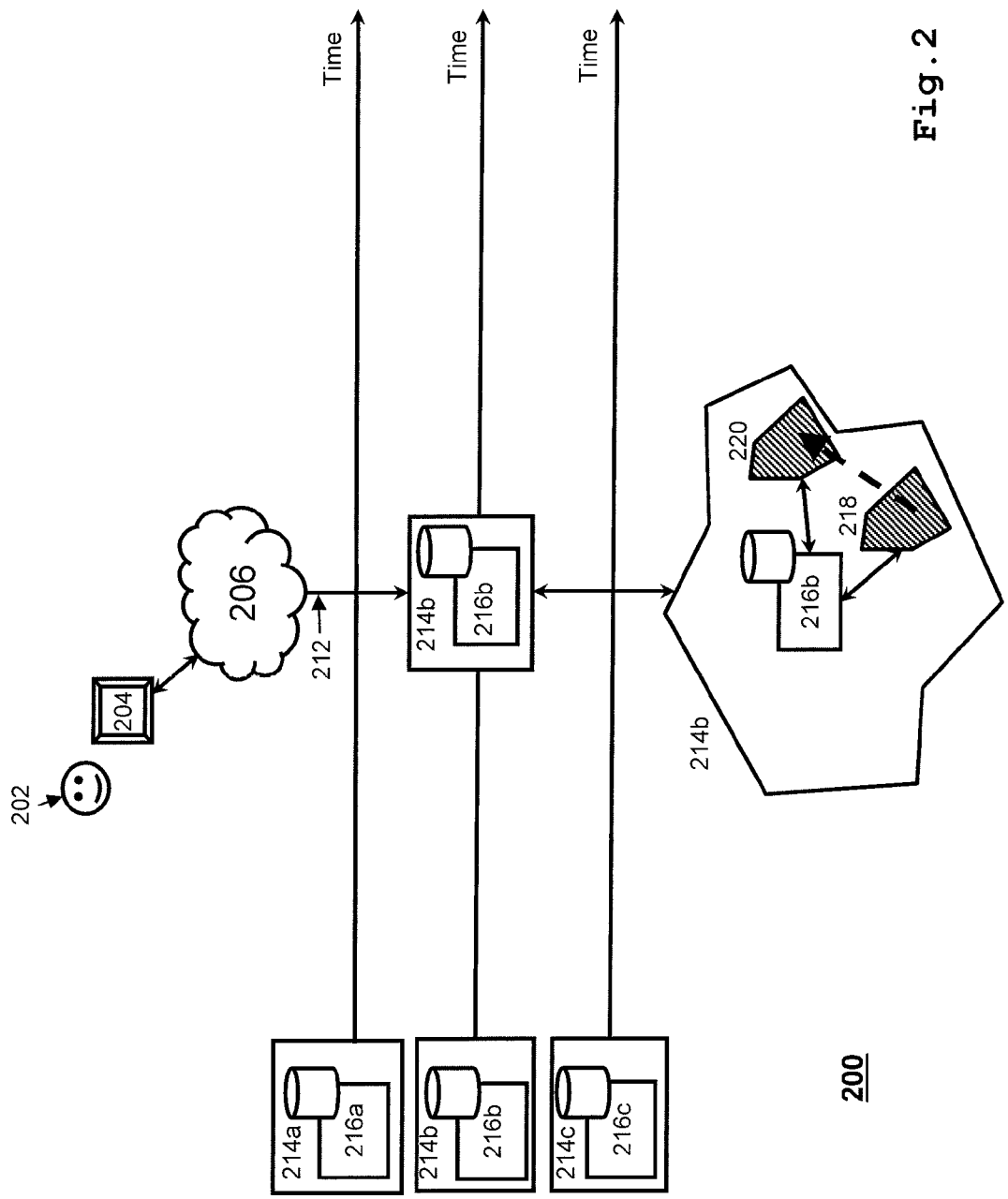
FIG. 2 shows an exemplary overview of a system architecture and how in time a content provider may configure a communication node in a specific predefined access zone.

FIG. 2 shows an exemplary overview of a system architecture 200 wherein a content provider 202 may configure a communication node 216a, 216b, 216c in a specific predefined access zone 214a, 214b, 214c via an interface 204. In this example the content provider 202 is located in the World Wide Web 206. The horizontal time lines (shown as "Time") indicate that a predefined access zones 214a, 214b, 214c are in existence before and after a content provider 202 decides to send information through the system. At the bottom of the FIG. 2 the access zone 214b is zoomed in to show more details.

In this example, the content provider 202 has created information specific to predefined access zone 214b. The content provider 202 may deploy information throughout the totality of the predefined access zone 214b or to a restricted sub access zone within 214b called a sector 218. Furthermore, sector 218 may have a lifetime that alters e.g. its restrictions, but not limited to the sectors position, borders and information into sector 220. Once a provider applies access restrictions 204, the distribution node 210 matches the content providers request with the appropriate access zone 214b and transfers the information via a gateway or Internet backhaul 212 to a communication node 216b in the access zone 214b.

Figure 3:
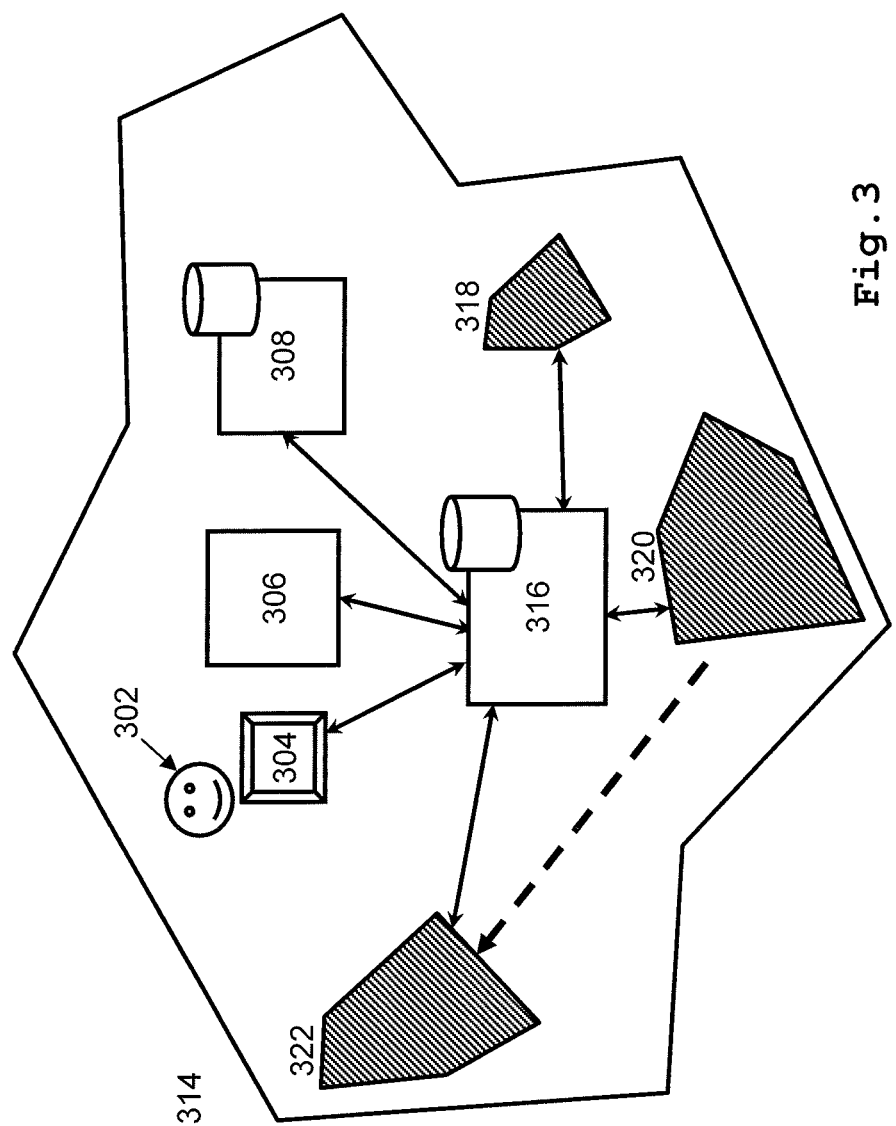
FIG. 3 shows an exemplary overview of a system architecture wherein a content provider may configure a communication node from within a predefined access zone.

The example of FIG. 3 shows a content provider 302 configuring a restricted access zone 314 and or sectors 318, 320 directly using the communication node 316 within the predefined access zone 314. In this example sector 320 has been configured with a lifetime to alter position and shape to sector 322. The creation process 304 and distribution process 308 process may be facilitated by the communication node's hardware 306 and an autonomous wireless area network, independent of the World Wide Web.

Figure 4:
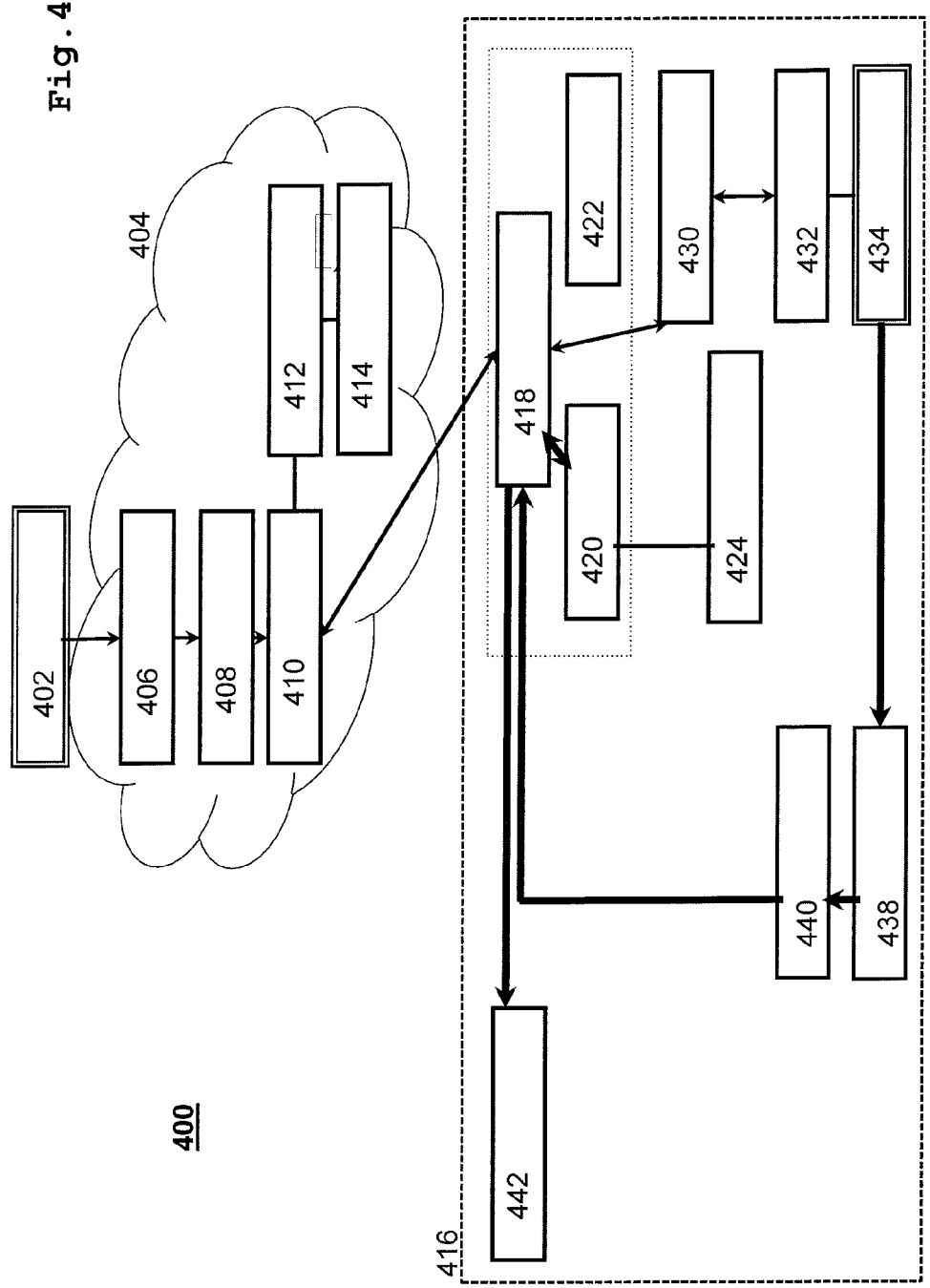
FIG. 4 shows an exemplary overview of a system architecture with two content providers utilizing a distribution node external to a predefined access zone and with communication nodes within the predefined access zone.

FIG. 4 shows an exemplary detailed overview of a network architecture as a workflow for two content providers: a first content provider 402 external to a predefined access zone 416 and a second content provider 434 within the predefined access zone 416. The first content provider 402 utilizes distribution node 410 in the World Wide Web 404 or any other external network, and uses a first communication node 418 in the predefined access zone 416. One or more computer servers 408 may be involved in the distribution of the content 406 from the first content provider 402 to the distribution node 410.

The first content provider 402 may be similar to the content provider 202 shown in FIG. 2. The predefined access zone 416 may be similar to the predefined access zone 214b.

The first content provider 402 may provide content 406 that is received by a first user device 432 in the predefined access zone 416. The first user device 432 may become a second content provider 434, e.g. when the user of the first user device 432 creates additional content 438. The additional content 438 may e.g. be send to a second user device 442 in the access zone 416 via communication node 440.

The content provider 402 may provide custom restrictions that e.g. include: location coordinates related to the predefined access zone 416 and/or restricted sectors there within; a lifetime (beginning date and/or time-end date and/or time); movement and/or other values. For content provider 402 the distribution node 410 may perform various tasks, such as: a mapping function 412 that matches location coordinates with coordinates in the predefined access zone 416 and/or sectors; a lifetime function 414 that matches content lifetime with the current time. Based on the outcome of the mapping function 412 and/or the lifetime function 414, the distribution node 410 may then send content 406 from the first content provider 402 to the matching access zone 416 and/or sector at the right time at the first communication node 418 so that the first user device 432 can receive the information after matching the user position by e.g. trilateration.

As described above, the first user device 432 may create additional content 438 and send this additional content 438 to the second user device 442. The access zone 416 may be or contain a mesh typology with multiple secondary communication nodes 430, 440 that trilaterate the position of user devices 432, 442 so that when e.g. the first user device 432 sends the additional content 438 to the second user device 442 the entire process of distributing content remains within the access zone 416, e.g. hopping between the second communication node 440 and the first communication node 418. First communication node 418 may be equipped with a distribution node 420 and a computer server 422 for creating the predefined access zone 416 and/or restricted sectors and applying the restrictions for the content providers 402, 434. In this example the access zone 416 is created in the World Wide Web. The first communication node 418 may handle both the content created by the external content provider 402, e.g. in the World Wide Web, and the content provider 434 within the access zone 416. The distribution node 420, when receiving content from within the access zone 416, may utilize: a user mapping function 424 to match location coordinates related to the content with location coordinates of a user device, such as the first user device 432. The first user device 432 may respond to the content and become the second content provider 434, resulting in the second content provider 434 creating additional content 438.

The first user device 432 may move around, thereby changing position resulting in another second communication node 440 becoming the nearest node in the mesh connecting with the first communication node 418. The additional content may then be made available to the second user device 442.

In the architecture as e.g. shown in FIG. 4 information to be delivered to an access zone and/or to configure the quality of an access zone and/or a sector within the access zone may be initiated in the external network, such as the World Wide Web, or within the network of the access zone itself. In FIG. 4, first user device 432, second user device 442 and second content provider 434 may engage with information sent from the World Wide Web 404 or from within the access zone 416. With content originating from an external network, such as the World Wide Web 404, any interaction within the predefined access zone 416 with the origin of that content is preferably made via the first communication node 418. Depending on user's (i.e. user device's) position, communication between the user device 432, 442 and the first communication node 418 may be direct or hopping across one or more secondary communication nodes 430, 440. Once interaction with the content begins within the access zone 416 as exemplified between the first user device 432 and the second user device 442, all computations, server and/or application functionalities such as but not limited to searching, navigation, streaming and/or VOIP calling are preferably distributed exclusively via the first communication node 418 and its mesh typology formed by the communication nodes 418, 430, 440 in the access zone 416.

In the example of FIG. 4 (and also in the example of FIG. 5, which will be described below) the thicker arrow lines indicate content data that is internally circulated within the access zone 416 (and 504 respectively). Whilst enabling a gateway to the World Wide Web 404, the architecture's restrictions to the predefined access zone provide users with purely local and timely information relieving the users and the involved networks of overflow of information and security breaches by third parties outside the predefined access zone, such as may be found on the World Wide Web. Furthermore, by prioritizing local information, data transfer rates, availability of broadband and a reduction of energy consumption at the point of the network server are gained.

Figure 5:
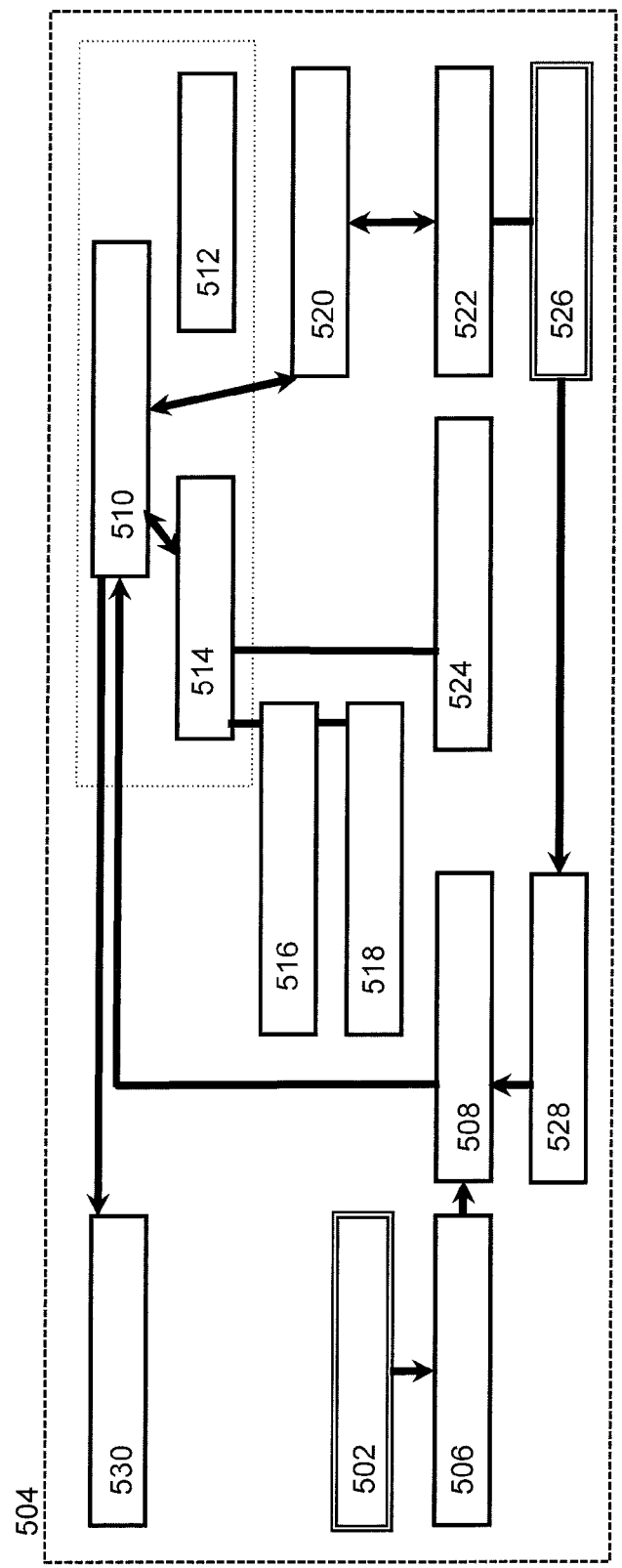
FIG. 5 shows an exemplary overview of a system architecture with two content providers within a predefined access zone and with communication nodes within the predefined access zone.

The example of FIG. 4 is similar to the example of FIG. 5, with the difference that in FIG. 5 the first content provider with its content, the distribution node, the mapping function and the lifetime function are located within the predefined access zone.

FIG. 5 shows an exemplary detailed overview of a network architecture as a workflow for content providers 502, 526 utilizing a distribution node 514 of a first communication node 510 within a predefined access zone 504. First content provider 502 may be similar to the first content provider 402 of FIG. 4 in terms of the ability to connect with a first communication node and to provide access and/or time restrictions for access zone(s) and/or a sector(s) within said zone(s). First communication node 510 may be equipped with the distribution node 514 and a computer server 512 for creating the predefined access zone 504 and applying the restrictions from content providers such as the first content provider 502.

In the example of FIG. 5, the first content provider 502 distributes content 506 by hopping via second communication node 508 to connect with the first communication node 510. Distribution node 514 may perform a zone mapping function 516 to determine restrictions of access and a zone lifetime function 518 to determine start and end of access. When a first user device 522 connects with the access zone 504, in this example the user device's position is determined by a user mapping function 524 and a connection to the first communication node 510 is made by hopping via communication node 520. The first user device 522 may respond to the content 506 and become a second content provider 526 creating additional content 528. If e.g. the first user device 526 changes position, another communication node 508 may become a nearest node in the mesh connecting with the first communication node 510. The additional content may then be made available to a second user device 530.

It is possible that the examples of FIG. 4 and FIG. 5 coexist. The predefined access zones 416 and 504 may be non-overlapping access zones, partially overlapping access zones or identical access zones.

Figure 6:
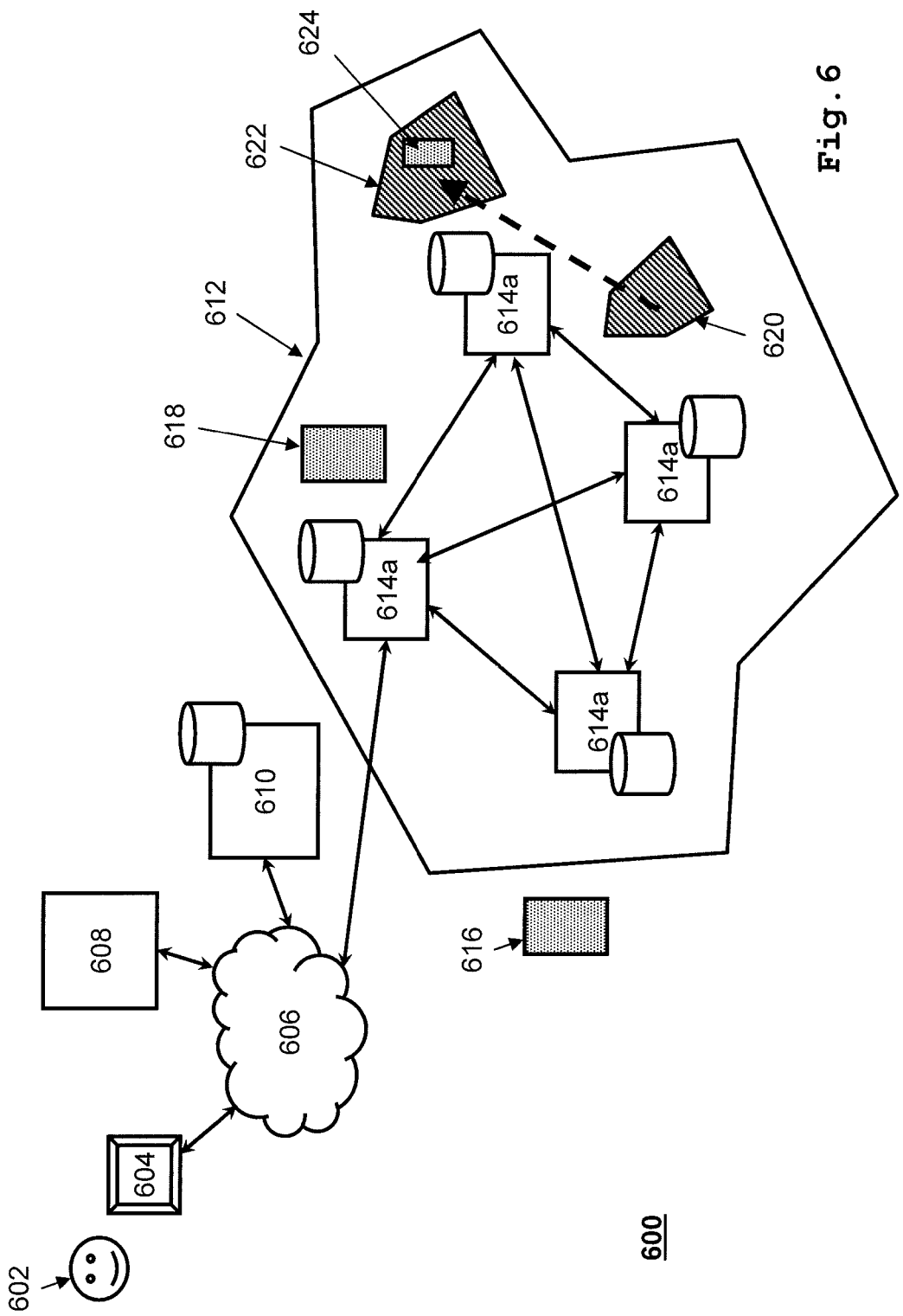
FIG. 6 shows an exemplary system for providing content associated with a geographical sector to a user device located in a predefined access zone.

FIG. 6 shows an exemplary system 600 for providing content associated with a geographical sector (e.g., geographical sector 620) to a user device (e.g., a user device 616 and a user device 618) located in a predefined access zone 612. One first communication node may be equipped with a distribution node, mapping function and storage. One or more secondary communication nodes 614a are located in the predefined access zone. The communication node(s) may include a communication module for providing wired and/or wireless communication to user device(s) and/or other communication nodes. The communication nodes may include a storage device for storing content, e.g., in at least one database. The communication nodes generally each have a fixed location in the predefined access zone, while in some embodiments, a communication node may move over time. Advantageously, a plurality of communication nodes may be provided in a particular predefined access zone to ensure proper coverage of the predefined access zone, especially if the communication nodes are placed in a large predefined access zone or a densely populated or structurally complex predefined access zone (e.g., in urban areas, in buildings, in campuses).

In some embodiments, a content provider 602 may provide content that is associated with a particular geographical sector (e.g., geographical sector 620). The content may be provided through a user interface 604 (e.g., a software application, a web site, a widget). The content provider may provide the content, and a specification or identifying information for the geographical sector to which the content associates. In some embodiments, the geographical sector is automatically determined from the content itself, assigned by default, assigned based on the identity of the content provider, determined by random, and/or determined by other predetermined factors.

Optionally, the content provider may specify and provide a lifetime (i.e., time and/or duration) for when the content is accessible. In some embodiments, the content provider may provide keywords associated with the content to facilitate the searching for the content. In certain embodiments, the keywords may be extracted from the content or automatically assigned based on the content and/or other predetermined factors.

The content provider may be required to pay for distributing and/or making the content available via the communication nodes located within the predefined access zone, in accordance with a suitable business models (e.g., per view, per amount of time, per frequency, subscription/membership, auction/biding, etc.). The revenue from content providers may be used to support the infrastructure of the system.

The content collected, e.g., via a communication network 606 such as the Internet, may be optionally stored on a computer server 608 (e.g., a web server on the Internet) for maintaining the content received from the user interface. In the case of a web server, the computer server may host a web site (i.e., the user interface) to receive content from content providers. One skilled in the art would appreciate that other technical means for receiving content from a content provider is envisioned.

The computer server 608 may be communicably connected, e.g., over the network, to a distribution node 610, which is configured to determine to which first communication node the content should be transmitted. In some embodiments, the functionality of the distribution node 610 may be implemented at least in part, alternatively, in the computer server rather than in a separate entity. The distribution node has a mapping function, which enables the distribution node to determine whether a particular geographical sector falls in or intersects with a particular predefined access zone (or whether a particular predefined access zone includes or overlaps with a particular geographical sector). The overlapping or intersection determination may be done in two-dimensional space and/or a three-dimensional space. The distribution node may store coordinate information associated with at least one predefined access zone (defined in a suitable reference frame).

The mapping function may, for example, take the coordinate information of a geographical sector, and applies an algorithm to determine if the geographical sector falls in a predefined access zone using the coordinate information associated with the at least one predefined access zones. The output of the mapping function may include an identifier for a predefined access zone that at least intersects with the particular geographical sector. In some cases, the output of the mapping function may indicate that no intersection was found. In certain cases, the output of the mapping function may output more than one identifiers associated with a plurality of predefined access zones which at least intersects with the particular geographical sector.

In some embodiments, the mapping function outputs at least one resource locator for a communication node located within the overlapping/intersecting predefined access zone. The resource locator may be a network address. The resource locator enables the distribution node to address/locate one or more communication node that would receive the content. In some embodiments, the resource locator is associated with a gateway communication node configured to receive content at the edge of a mesh network of communication nodes. In certain embodiments, the mapping function determines the resource locator associated with a communication node (or more) that is located in relatively closer proximity to the geographical sector of the content. In certain embodiments, the mapping function may determine the resource locator on the basis of the statuses of the communication nodes (e.g., activity, on/off, etc.).

The distribution node, after receiving content from a computer server, determines the geographical sector to which the content is associated (e.g., geographical sector 620). Then, using the mapping function, the predefined access zone that includes and/or intersects the geographical sector is determined. The content is then provided to at least one of the communication nodes in the predefined access zone that at least intersects with the geographical sector, e.g., by using a resource locator of a communication node in the predefined access zone. Advantageously, location-specific information is placed directly in a location that is near or at the geographical sector associated with the content. This mapping function ensures location specificity, and disallows non-relevant information from being made available at the communication nodes.

In some embodiments, the content provided by the content provider may be associated with a lifetime. A lifetime may be specified by time information (e.g., a specific point in time, start time) and duration information (e.g., end time, amount of duration). The lifetime may restrict the time period in which the content is accessible by user devices in communication with the communication node(s) of the predefined access zone. In certain embodiments, the distribution node may only enable the distribution of the content to the communication node(s) during the lifetime of the content (or moments before the lifetime begins).

The content provided to the at least one communication nodes may be stored on a storage device in the communication node. In some embodiments, the communication nodes are implemented to form a mesh network. The storage of content on the communication nodes within the mesh network may be distributed in a manner to achieve better load balancing. Redundant copies of content may be stored across the communication nodes in the mesh network to ensure that if a subset of the communication nodes fail, that other communication nodes having copies of the content may assist in data recovery and provide some resilience against failure in the network. In some embodiments, the storage of the content and/or the distribution of the content in the mesh network of communication nodes may depend on the distances (e.g., the proximity) of a geographical sector of the content from the various communication nodes. For instance, the communication node(s) closest (relatively closer) to the geographical sector of the content may store the content within the predefined access zone.

If a user device (e.g. a mobile device, a television display, a personal computer, any suitable device enabling a user to consume content, etc.) is located within the predefined access zone, the user device is provided with access to the content stored on any of the storage device(s) of the communication node(s) located in the predefined access zone. For instance, when the user device 618 is within the boundaries of the predefined access zone 612, the user device may access the content stored in the storage device, e.g., at one of the communication nodes 614a.

The location information of the user device may be used to determine whether the user device is within the predefined access zone. In some embodiments, the user device may provide location information from the user device to a communication node (e.g., coordinates measured from a global positioning system). In some embodiments, a substantially unique identifier of the user device, if a mapping of the unique identifier to location information is known, then the location information may be determined by the unique identifier provided by the user device. In some embodiments, (Wi-Fi) trilateration may be used to determine/estimate the location of the user device, e.g., by measuring roundtrip time and/or signal strength information associated with the user device from a plurality (preferably 2) access points or secondary communication nodes relative to the 1st communication node.

When the user device is located within the predefined access zone (and a communication node has determined that the user device is indeed within a predefined access zone), the user device is provided with access to the content stored at a communication node. The user device may transmit a request for content, wherein the request may include at least one search parameter (e.g., category, keyword, time restriction, user profile attributes, language, etc.). The search parameter(s) is used as part of a search query for content that matches the search parameter(s). The search query may be performed on one or more storage devices of the communication nodes in the predefined access area.

In some embodiments, the request may include location information of the user device such that the location information may be used to determine whether the user device transmitting the request is within the predefined access zone. In certain embodiments, the location information may be used to sort the search results (i.e., content) in an order based on the user device's proximity to the geographical sector(s) of the items in the search results.

On the basis of the received request, a communication node may execute a search query on one or more storage devices of the communication nodes in the predefined access zone for content that matches the search parameter(s). The content or a plurality of content items matching the search parameters is provided, e.g., as search results, to the user device.

In some embodiments, the content is pushed to a user device when it is determined that the user device is configured to receive content from the communication node(s) and the user device is located within the predefined access zone.

If content being searched (and matches the search parameters) is associated with a lifetime, the communication node may determine whether the time of the request is during the lifetime associated with the content. If the time of the request is during the content, access to the content is provided (e.g., providing it as part of the search results). If the time of the request is before the lifetime or after the lifetime, access to the content is restricted (e.g., the search results will not include the content).

While user device(s) located within the predefined access area zone is provided with access to content stored on storage devices in the communication nodes of the predefined access zone, user devices such as user device 616 (even when the user device is within communication range with at least one of the communication nodes) outside a predefined access zone is restricted from accessing the content stored in the predetermined access zone. In other words, the content distributed to the communication node(s) of the predefined access zone is not provided to the user device.

In some embodiments, when the user device is within communication range with at least one of the communication nodes, but not within the predefined access zone, the user device may be provided with directional information (e.g., compass, route guidance, etc.) to guide the user device towards the predefined access zone. For instance, the user device may be provided with a message or guidance information to lead the user device towards the predefined access zone. The user device may include a guidance software application, which enables a route to be provided to the user to head towards the predefined access zone.

Besides determining whether a user device is within a predefined access zone, the location information of the user device may be used to determine whether the user device is in (sufficient) proximity to a particular geographical sector (e.g., a point of interest) within or intersecting the predefined access zone. In some embodiments, a geographical sector, such as a point of interest indoors, may be difficult to reach for a user. Upon determining that the user device of the user is within sufficient proximity to that geographical sector, content including three-dimensional directional and/or routing information (guidance) may be provided to the user device. Advantageously, the user may be guided, e.g., step by step, to reach a particular (hard to find) point of interest.

Some of the embodiments herein describe restricting access at the border of the predefined access zone. However, other types of access restriction are envisioned. For instance, a user device 618 in access zone 612 may get restricted information (e.g., directional information to the existence of geographic sector 622, and/or a part of the content, promotional information). Directional information may indicate, to a user of the user device, a route or direction to reach or enter the geographical sector. Only user device 624 may get full access in geographic sector 622 because user device is located in the geographic sector.

In certain embodiments, a user device 618 in the access zone may view and/or interact with point(s) of interest to which content is associated. Points of interests (as seen as triangles in FIG. 1), may be represented by at least one of: a part of the content, an abstract version of the content, a digest version of the content, an icon of the content, a summary of the content, directional information etc. In some embodiments, a map or routing application on the user device may enable the user to view the locations of the point(s) of interests within a particular predefined access zone if the user device is located within the predefined access zone.

In some embodiments, for increased security for the user device and/or to avoid unrestricted content from entering the mesh network of communication nodes, the user devices in communication with the communication nodes may not access the Internet or another network outside of the mesh network through the mesh network of communication nodes. For instance, it is envisioned that purchases, electronic commerce transactions, electronic trading transactions, and/or communications between user devices in communication with the communication nodes of the mesh network may be executed within the mesh network of communication nodes. In certain embodiments, further communication nodes may be provided to offer other types of services that are executable within the predefined access zone and or sector. A sector can be used as a temporary track for distributing content from A to B. For instance, trading and commerce may be executed by payment authorization nodes that are communicably connected to at least one of the communication nodes of the mesh network.

In some embodiments, the geographical sector associated with content may be dynamic. The geographical sector may change in its location and/or its size/volume over time. Advantageously, the content may be tied to different geographical sectors at various points in time, e.g., going from the geographical sector 620 to 622. The dynamic geographical sectors enable the content to stay relevant to the users accessing the content, even if the content may move (e.g., like a parade, or emergency information for routing traffic during events, etc.). In some embodiments, if the geographical sector moves from the inside to the outside of the predefined access zone, then the content associated with the geographical sector would no longer be accessible to user devices within that predefined access zone. In certain embodiments, the distribution node may instruct at least one communication node of the predefined access zone to restrict access to the content. In some other embodiments, the communication node having the content on its storage device may trigger the restriction of access to the content. In certain embodiments, the content is removed from storage device(s) of the communication node(s) in the predefined access zone.

The communication node may include a communication module for communication with user devices, and further include a display device (e.g., an outdoor/indoor digital display) for displaying content. The content may be stored on a storage device in the communication node displaying the content, or it may be stored over the network on a storage device of a communication node communicably connected with the communication node that is displaying the content. The display enables content to be distributed to users within physical access to the communication node. For instance, users without a user device may still access and see the content displayed at the communication node. As a further advantage, a user seeing the display at the communication node may be informed or triggered to use a user device to communicate with the communication node to access (additional) content.

Once the content has been distributed to at least one of the communication nodes, the content may be modified with different and/or additional information. In some embodiments, user devices located within the predefined access zone (or the geographical sector, depending on where the border for accessing the content is defined) may add (related) information to the content stored in a storage device of a communication node. For instance, users may add reviews to restaurants; report sales occurring at a store, post photos of a local event, submit advertisements, etc. As a result, the content within the mesh network is able to evolve and/or grow organically from other users on user devices in the predefined access zone based on information that remains local and relevant to the users within the predefined access zone.

The examples of FIGS. 2-7 are presented as different embodiments of systems for providing content to one or more access zones. It should be appreciated, however, that these embodiments may be construed as describing one and the same system.

Figure 7:
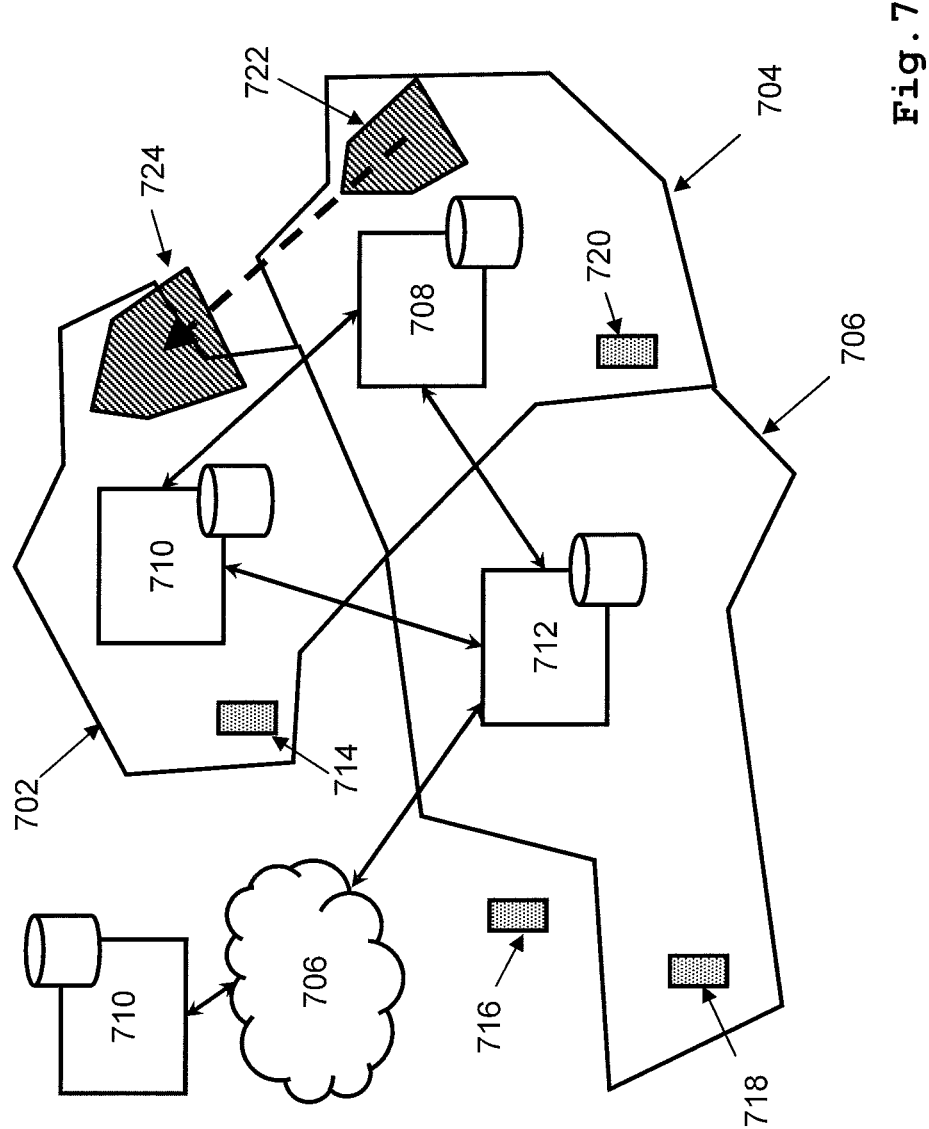
FIG. 7 shows another exemplary system for providing content associated with a geographical sector to a user device located in a predefined access zone.

FIG. 7 shows another exemplary system 700 for providing content associated with a geographical sector to a user device located in a predefined access zone. In some embodiments, more than one predefined access zones 702, 704, 706, may be provided, e.g., adjacent to each other. For instance, more than one predefined access zones may be provided in dense areas, and/or areas where a plurality of well-defined zones are needed to ensure the content to be provided is as local as possible to the users within each of the predefined access zones. In some embodiments, the predefined access zones do not substantially overlap each other. In some embodiments, the predefined access zones may overlap each other, and content from both or one of the overlapping predefined access zones may be made available to a user device located within the overlapping portion of the predefined access zones.

As described in relation to FIG. 7, user devices outside a predefined access zone (for example user device 716) do not have access to content stored in the predefined access zones. However, user device 718 may have access to content stored in storage device(s) of the communication node(s) 712 in the predefined access zone 706. For example a user device 714 in access zone 702 can get restricted information (directional info) to the existence of access zone 704. However only a user device 720 within the access zone 704 can get full data access to content stored in storage device(s) of the communication node(s) 708 because this user device is inside the access zone 704. For simplicity, only one box is shown for the communication node(s) 712, but it is envisioned that a plurality of communication nodes, preferably in a mesh network, is provided within the predefined access zone. Likewise, the user device 714,720 may have access to content stored in storage device(s) of the communication node(s) 710,708 respectively in the predefined access zones 702,704.

In the embodiment shown in FIG. 7, the communication nodes from a first predefined access zone may be in wired or wireless communication with another communication node of a second predefined access zone. Such a communication link enables content to be transmitted from one predefined access zone to another predefined access zone. For instance, a first (dynamic) geographical sector 722 may be in and/or intersects with the predefined access zone 704 associated with certain content. For instance, if a first (dynamic) geographical sector 722 moves and/or changes size/volume and becomes a second geographical sector 724 located in and/or intersects with the predefined access zone 702, the content for the (dynamic) geographical sector may be transmitted from a communication node (denoted by communication node 708) of the predefined access zone 704 to a communication node (denoted by communication node 710) of the predefined access zone 702. The copy of the content stored at the communication node 708 may be restricted for access by user device 720 after the move of the geographical sector. The copy of the content, in some cases, may be removed from the communication node 708.

In some embodiments, the communication nodes of the plurality of predefined access zones may autonomously determine within the predefined access zones that the geographical sector has moved between access zones, into an access zone, and/or out of an access zone. Network communication between communication nodes of different predefined access zones enables the content to travel substantially autonomously from a first predefined access zone to a second predefined access zone as the geographical sector moves from the first zone to the second zone.

In some embodiments, a distribution node (e.g., distribution node 610), may monitor the changes in the (dynamic) geographical sectors such that the communication nodes at the different predefined access zones may be instructed to store the content, restrict access to the content, and/or remove the content as the geographical sector move from one predefined access zones to the next.

In some embodiments the access zone(s) may be configured by defining the location coordinates falling within the access zone, the node to be used as first communication node, and possibly one or more other communication nodes to form a meth network within the access zone. This definition of an access zone is stored in a computer storage and may be used by a mapping function of a distribution node for distributing content from a content provider to the access zone. The thus configured access zone(s) are called the predefined access zones. Similarly a sector may be configured.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

1. A method for providing content to a user device located in a particular access zone selected from a plurality of access zones, wherein each of said plurality of access zones is created using a method for creating an access zone, the method for creating an access zone comprising:
determining one or more access zone defining location coordinates representing a predefined geographical area where the access zone is to be created;
storing in a first storage device associated with a distribution node, the one or more access zone defining location coordinates in association with an indication of a first communication node of the access zone where content is to be stored for use within the access zone and from where the content is providable to user devices located in the access zone, the method for providing content comprising:
receiving the content in the distribution node from a content provider, said content being associated with a geographical sector located in, or intersecting with, said particular access zone;
selecting the particular access zone by matching location coordinates of the geographical sector with the access zone defining location coordinates of the particular access zone and retrieving from the first storage device the indication of a particular said first communication node of the selected particular access zone;

transmitting, based on the retrieved indication, the content from the distribution node to the particular first communication node; and storing the content in a second storage device associated with the particular first communication node from where the content is providable to a user device in the selected particular access zone, wherein the user device is in wired or wireless communication with the particular first communication node, the method further comprising:

determining a position of the user device, using the particular first communication node, or one or more further communication nodes located in the selected particular access zone that form a mesh network with the particular first communication node;

determining that the position Of the user device is within the selected particular access zone and/or geographical sector, and, if so, providing the content to the user device via any one of the particular first communication node and the further communication nodes:

receiving from the user device at the particular first communication node additional content related to the provided content, and distributing the additional content from the particular first communication node to a second user device located in the selected particular access zone and/or the geographical sector, via direct communication or via said one or more further communication nodes, and while the additional content is distributed to the second user device, the additional content remains within the selected particular access zone.

2. The method according to claim 1, wherein the content as received in the distribution node is further associated with a lifetime, the method further comprising:

matching the lifetime with a current time to obtain a matching result; and based on the matching result enabling or disabling the content to be providable to the user device.

3. The method according to claim 1, wherein the content provider and the distribution node are located external to the selected particular access zone.

4. The method according to claim 1, wherein the content provider and the distribution node are located within the selected particular access zone and wherein the content provider communicates with the distribution node via the particular first communication node or the mesh network.

5. The method according to claim 1, wherein the geographical sector associated with the content includes a two-dimensional area that changes in size and/or a three-dimensional space that changes in size.

6. The method according to claim 5, further comprising:

determining a change in at least one of position and size of the geographical sector associated with the content on the basis of at least one of the following user-specified parameters: acceleration, speed, path, and trajectory;

determining an updated geographical sector associated with the content based on the change, if any, wherein the updated geographical sector is different from the geographical sector that was originally associated with the content;

selecting a second access zone in which a second mesh network of communication nodes is located and which encompasses or intersects with the updated geographical sector, and wherein the second selected access zone is different from the first selected access zone;

transmitting the content from at least one of the communication nodes of the mesh network or from both the content provider and at least one of the communication nodes of the mesh network, to at least one of the communication nodes of the second mesh network associated with the second selected access zone;

storing the content in a third storage device associated with the at least one communication node of the second mesh network; and removing the content stored in the second storage device, preventing access to the content stored in the second storage device, or removing at least some of the content stored in the second storage device and preventing access to remaining content stored in the second storage device.

7. The method according to claim 1, wherein the position of the user device is determined by trilaterating the position within the selected particular access zone or the geographical sector using the particular first communication node and at least two other nodes, wherein one of the at least two other nodes is the user device.

8. The method according to claim 1, further comprising at least one of the steps of:

not providing the content from the particular first communication node to the user device when the position of the user device is not within the selected particular access zone; and restricting the user device from accessing the content in the particular first communication node when the position of the user device is not within the selected particular access zone.

9. The method according to claim 1, further comprising:

receiving the content in the user device;

modifying the content in the user device to obtain additional content; and storing the additional content with the user device from where the additional content is providable to a further user device in the selected particular access zone and/or geographical sector.

10. The method according to claim 1, further comprising:

providing at least one of directional information and a portion of the content to the user device when the user device is within the selected particular access zone but is not within the geographical sector, wherein said directional information indicates, to a user of the user device, a route or direction to reach or enter the geographical sector.

11. The method according to claim 1, further comprising at least one of the steps of:

not providing the content from the particular first communication node to the user device when the position of the user device is not within the geographical sector but is within the selected particular access zone; and restricting the user device from accessing the content in the particular first communication node when the position of the user device is not within the geographical sector but is within the selected particular access zone.

12. The method according to claim 1, further comprising steps of:

receiving from the user device a request for content, said request comprising at least one search parameter;

performing a search query on at least one of the second storage device and other storage devices in other communication nodes in the mesh network for content matching the at least one search parameter;

providing content matching the at least one search parameter to the user device if the content matches the at least one search parameter and if access to the content is allowed.

13. The method according to claim 1, further comprising:
providing directional information to the user device when the user device is within a communication range with a communication node of the mesh network but the position of the user device is not within the selected particular access zone,
wherein said directional information indicates, to a user of the user device, a route or direction to reach or enter the selected access zone.

14. The method according to claim 1, wherein at least a subset of the communication nodes in the mesh network is configured to render the content for display on a display device of the communication node.

15. The method according to claim 1, further comprising:
determining whether the user device is in proximity to a point of interest based on the position of the user device, said point of interest being located substantially indoors and located in the selected particular access zone;
providing at least one of three-dimensional directional and routing information to the user device when the user device is in proximity to the point of interest.

16. The method according to claim 1, wherein the content is associated with a lifetime, said lifetime comprising time information and duration information, and the content is provided to the user device only during the lifetime associated with the content.

17. A computer program product, implemented on computer-readable non-transitory storage medium, the computer program product configured for, when run on a computer, executing the method steps according to claim 1.

18. The method according to claim 1, wherein the geographical sector associated with the content includes a three-dimensional space that changes in volume.

19. The method according to claim 1, wherein the geographical sector associated with the content moves from one place to another over time.

20. The method according to claim 18, further comprising:
determining a change in at least one of position and size of the geographical sector associated with the content on the basis of at least one of the following user-specified parameters: acceleration, speed, path, and trajectory;
determining an updated geographical sector associated with the content based on the change, if any, wherein the updated geographical sector is different from the geographical sector that was originally associated with the content;
selecting a second access zone in which a second mesh network of communication nodes is located and which encompasses or intersects the updated geographical sector and wherein the second selected access zone is different from the first selected particular access zone;
transmitting the content from at least one of the communication nodes of the mesh network or from both the content provider and at least one of the communication nodes of the mesh network, to at least one of the communication nodes of the second mesh network associated with the second selected access zone;
storing the content in a third storage device associated with the at least one communication node of the second mesh network; and
removing the content stored in the second storage device, preventing access to the content stored in the second storage device, or removing at least some of the content stored in the second storage device and preventing access to remaining content stored in the second storage device.

21. The method according to claim 19, further comprising:
determining a change in at least one of position and size of the geographical sector associated with the content on the basis of at least one of the following user-specified parameters: acceleration, speed, path, and trajectory;
determining an updated geographical sector associated with the content based on the change, if any, wherein the updated geographical sector is different from the geographical sector that was originally associated with the content;
selecting a second access zone in which a second mesh network of communication nodes is located and which encompasses or intersects the updated geographical sector and wherein the second selected access zone is different from the first selected particular access zone;
transmitting the content from at least one of the communication nodes of the mesh network or from both the content provider and at least one of the communication nodes of the mesh network, to at least one of the communication nodes of the second mesh network associated with the second selected access zone;
storing the content in a third storage device associated with the at least one communication node of the second mesh network; and
removing the content stored in the second storage device, preventing access to the content stored in the second storage device, or removing at least some of the content stored in the second storage device and preventing access to remaining content stored in the second storage device.

22. The method according to claim 1, wherein each access zone of said plurality of access zones comprises a communication node and a storage device associated with this communication node.

23. The method according to claim 1, wherein the second storage device is located in the selected particular access zone.

24. A content delivery system for delivering content to a user device located in a particular access zone selected from a plurality of access zones, the content delivery system comprising a distribution node and at least one communication node, wherein the distribution node is configured to create each of said plurality of access zones by:
determining one or more access zone defining location coordinates representing a predefined geographical area where the access zone is to be created;
storing in a first storage device associated with the distribution node the one or more access zone defining location coordinates in association with an indication of a first communication node of the access zone where content is to be stored for use within the access zone and from where the content is providable to user devices located in the access zone, wherein the distribution node is configured to perform steps of:
receiving the content in the distribution node from a content provider, said content being associated with a geographical sector located in, or intersecting with, said particular access zone;

selecting the particular access zone by matching location coordinates of the geographical sector with the access zone defining location coordinates of the particular access zone and retrieving from the first storage device the indication of a particular said first communication node of the selected particular access zone;

transmitting, based on the retrieved indication, the content from the distribution node to the particular first communication node; and wherein the user device is in wired or wireless communication with the particular first communication node; and the content delivery system is further configured to perform steps of:

storing the content in a second storage device associated with the particular first communication node from where the content is providable to a user device in the selected particular access zone, determining a position of the user device, using the particular first communication node, or one or more further communication nodes in the selected particular access zone that form a mesh network with the particular first communication node;

determining that the position of the user device is within the selected particular access zone and/or the geographical sector, and, if so, providing the content to the user device via any one of the particular first communication node and the further communication nodes;

receiving from the user device at the particular first communication node additional content related to the provided content, and distributing the additional content from the particular first communication node to a second user device in the selected particular access zone and/or the geographical sector via direct communication or via said one or more further communication nodes, and, while the additional content is distributed to the second user device, the additional content remains within the selected particular access zone.

25. The content delivery system according to claim 24, wherein the content as received in the distribution node is further associated with a lifetime, and the distribution node is further configured to:

match the lifetime with a current time to obtain a matching result; and based on the matching result enable or disable the content in the particular first communication node to be providable to the user device.

26. The content delivery system according to claim 24, wherein the distribution node is further configured to:

determine a geographical sector associated with the content as received in the distribution node;

determine whether the access zone includes or overlaps the geographical sector associated with the content as received in the distribution node, and, if so, determine at least one of the communication nodes of the mesh network that is associated with the geographical sector associated with the content as received in the distribution node; and transmit the content to the at least one communication node in the mesh network.

* * * * *